United States Patent [19]

Miyamoto et al.

[11] Patent Number: 5,031,952

[45] Date of Patent: Jul. 16, 1991

[54] SUNVISOR ARRANGEMENT FOR AUTOMOTIVE VEHICLE OR THE LIKE

[75] Inventors: Hideyuki Miyamoto, Atsugi; Makoto Tamuraya, Isehara; Shigeki Yoshioka, Yokohama; Hideyuki Shibuya, Yokosuka; Masayuki Touda, Yokosuka; Satoru Ichikawa, Yokosuka, all of Japan

[73] Assignee: Nissan Motor Co., Ltd., Yokohama, Japan

[21] Appl. No.: 432,678

[22] Filed: Nov. 7, 1989

[30] Foreign Application Priority Data

Nov. 11, 1988 [JP] Japan .................. 63-284935

[51] Int. Cl.⁵ .................................... B60J 3/02
[52] U.S. Cl. ...................... 296/97.4; 296/97.11
[58] Field of Search .............. 296/97.1, 97.4, 97.11

[56] References Cited

U.S. PATENT DOCUMENTS

Re. 28,346 2/1975 Kilianstadten et al. .
4,149,749 4/1979 Canal ............................ 296/97.1
4,491,360 1/1985 Fleming .
4,492,404 1/1985 Marcus et al. .
4,679,842 7/1987 Hwang-Change ........... 296/97.11

FOREIGN PATENT DOCUMENTS 3512807 10/1986 Fed. Rep. of Germany .
47-44723 12/1972 Japan .
56-127008 9/1981 Japan .
60-186230 12/1985 Japan .
60-188629 12/1985 Japan .
210122 9/1987 Japan ............................ 296/97.4

Primary Examiner—Margaret A. Focarino
Assistant Examiner—Gary C. Hoge
Attorney, Agent, or Firm—Foley & Lardner

[57] ABSTRACT

A sunvisor body is selectively movable from a stored position wherein it is concealingly received in an enclosure formed between the vehicle roof and a headliner. Upon reaching a fully projected position, a drive rail arrangement including a crank mechanism induces the visor body to pivot to a predetermined shading position.

25 Claims, 10 Drawing Sheets

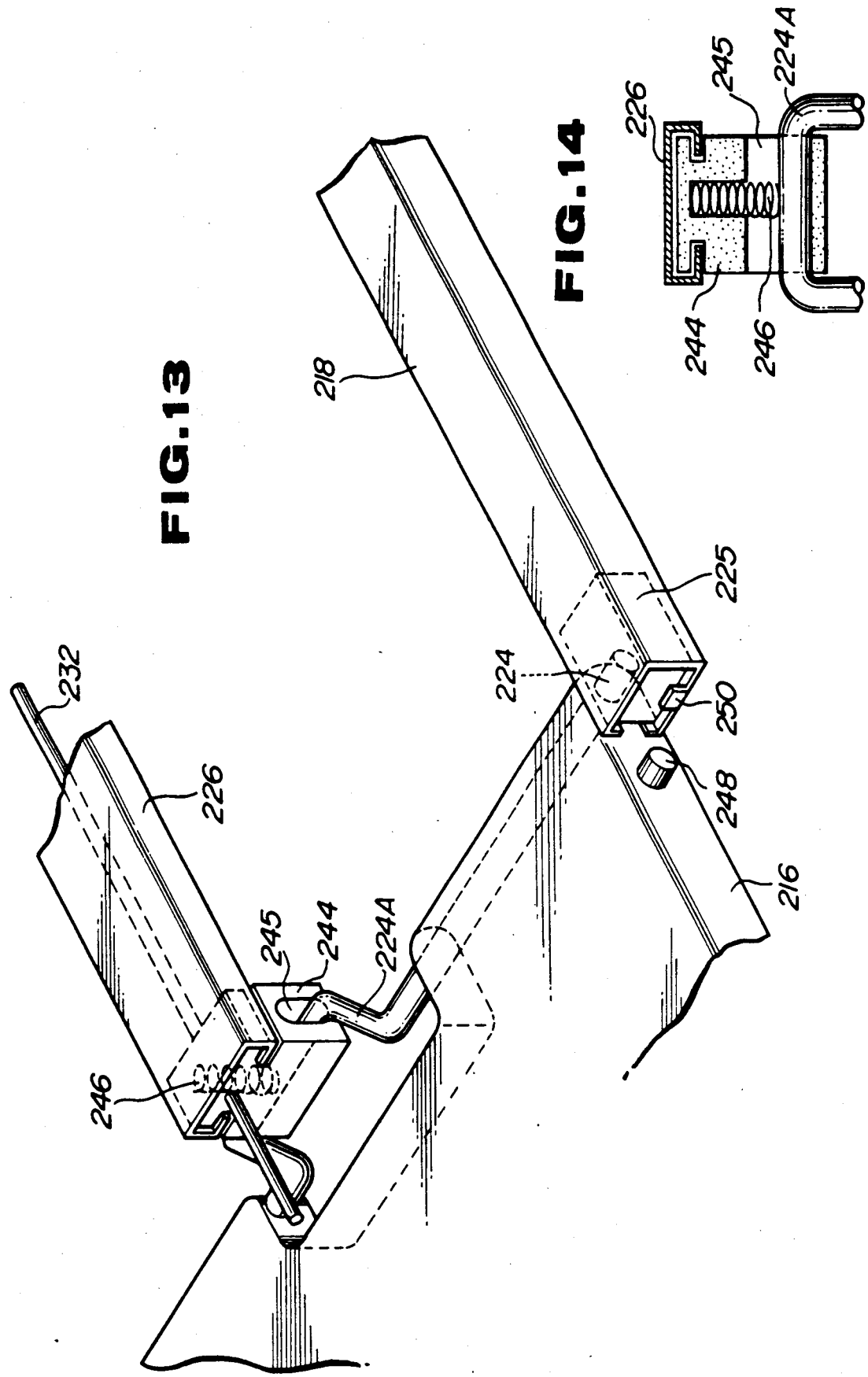

FIG.22
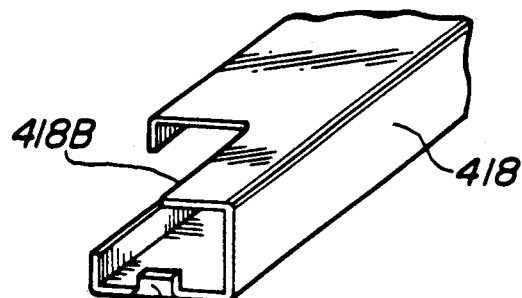
FIG.23
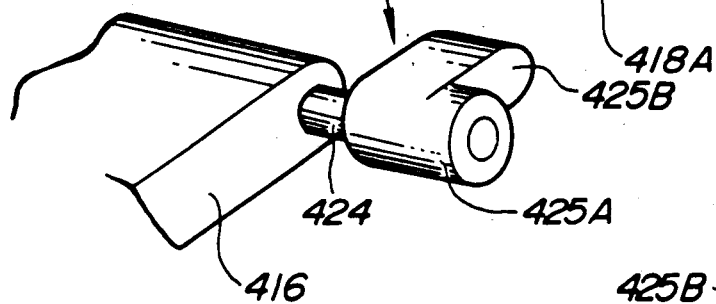
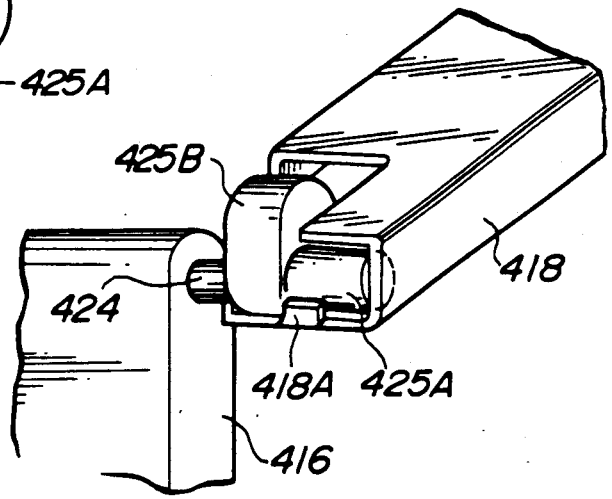
FIG.24
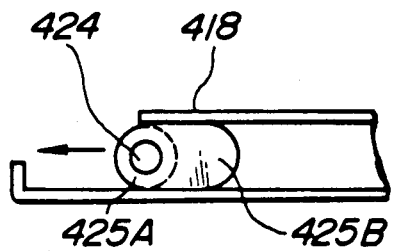
FIG.25
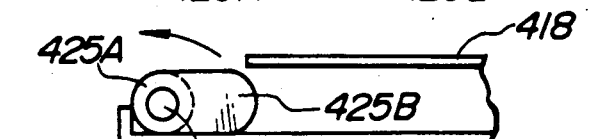
FIG.26
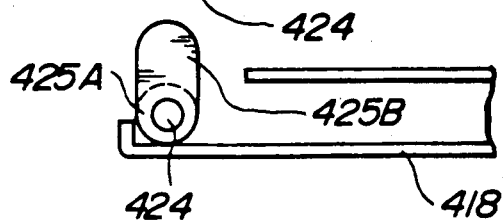

SUNVISOR ARRANGEMENT FOR AUTOMOTIVE VEHICLE OR THE LIKE

BACKGROUND OF THE INVENTION

1. Field of the Invention

The present invention relates generally to sunvisor for an automotive vehicle or the like, and more specifically to a sunvisor arrangement which can automatically move a visor body out of an overhead storage compartment and pivot the same to an operative shading position.

2. Description of the Prior Art

Various arrangements have been proposed wherein a sunvisor element is movable from a storage position to an operative one in response to the selective operation of a servo motor or the like. JP-A-47-44723 discloses an arrangement wherein a sunvisor element is slidably mounted on a pair of parallel rails and arranged to be selectively movable between a storage position and one wherein the element is positioned in a position which shades the vehicle occupant from the bright sun or similar sources of bright light.

However, this arrangement has suffered from the drawback that the sunvisor element is required to be curved and to be moved along curved guide rails in order to assume the required shading position. This of course imposes various design limitations on the arrangement.

SUMMARY OF THE INVENTION

It is an object of the present invention to provide a visor arrangement wherein the visor can be stored in a cavity or compartment formed in the ceiling of a vehicle cabin and which can be selectively moved out of the cavity under the control of a suitable servo mechanism and subsequently swung, without manual intervention, to an appropriate operative position.

In brief, the above object is achieved by an arrangement wherein the shaft on which the visor body is supported is provided with a crank arrangement. This crank cooperates with a slider arrangement provided in a drive rail arrangement in a manner wherein after the movement of the slider has moved by a predetermined amount in the forward direction and moves the visor body from a concealed position within a recess, to a position wherein it totally projects therefrom, further forward movement of the slider along the drive rail causes the visor body to tilt and assume an operative shading position.

More specifically, a first aspect of the present invention is deemed to comprise an apparatus, which features:

an automotive body having a passenger compartment, the passenger compartment having a windshield, a roof and a headliner, a concealed space being defined between the roof and the headliner, the concealed space having an open front end directed generally parallel to the windshield; a visor; means for mounting the visor such that said visor is slidable from concealed position in said concealed space to an exposed position adjacent said windshield and angularly movable in said exposed position through an arc having a constant radius of curvature and extending from adjacent the windshield to a position angled inwardly of the passenger compartment.

A second aspect of the invention is deemed to comprise an apparatus, which features:

an automotive body having a passenger compartment, the passenger compartment having a windshield, a roof and a headliner, a concealed space being defined between said roof and said headliner, said concealed space having an open front end directed generally parallel to said windshield; a visor; first guide means comprising first and second guide tracks positioned on opposite lateral sides of said visor and substantially concealed in said concealed space; first and second followers attached to said lateral sides of said visor and received, respectively, in said first and second guide tracks; second guide means for guiding said visor out of said concealed space and pivoting said visor about said first and second followers, said second guide means comprising a drive rail positioned above and in the lateral center of said visor and substantially concealed in said concealed space; a drive rail follower extending from an upper surface of said visor into engagement with said drive rail; and means attached to said drive rail follower to produce powered movement of the drive rail follower.

A further aspect of the invention is deemed to comprise an apparatus, which features an automotive body having a passenger compartment, the passenger compartment having a windshield, a roof and a headliner, a concealed space being defined between the roof and the headliner, said concealed space having an open front end directed generally parallel to the windshield, a visor, means for mounting said visor such that said visor is slidable from a concealed position in the concealed space to an exposed position adjacent the windshield and angularly movable in said exposed position through an arc having a constant radius of curvature and extending from adjacent the windshield to a position angled inwardly of the passenger compartment; said means for mounting comprising a first track having a linear guide and a first follower attached to a rear of said visor and positioned in the linear guide, the linear guide having a first end and a second end, the second end being positioned adjacent the open front of the concealed space, a second track having a guide with a linear guide portion and a curved guide portion and a second follower attached to said visor and positioned in the guide of the second track, the curved guide portion having a constant radius of curvature about the second end of said linear guide the curved guide portion extending upwardly from the linear guide portion.

BRIEF DESCRIPTION OF THE DRAWINGS

FIG. 13 is a perspective view showing a third embodiment of the present invention;

FIG. 14 is a front sectional elevation as taken along section line XIV—XIV;

FIGS. 22 and 23 are perspective views showing the construction and arrangement of one of the guide rails shown in FIG. 18 and a slider which is operatively received therein; and FIGS. 24 through 26 are side elevational views showing the manner in which the sliders of the fifth embodiment cooperate with stoppers formed at the forward ends of the guide rails, to facilitate pivoting of the visor.

DETAILED DESCRIPTION OF THE PREFERRED EMBODIMENTS

Figure 1:
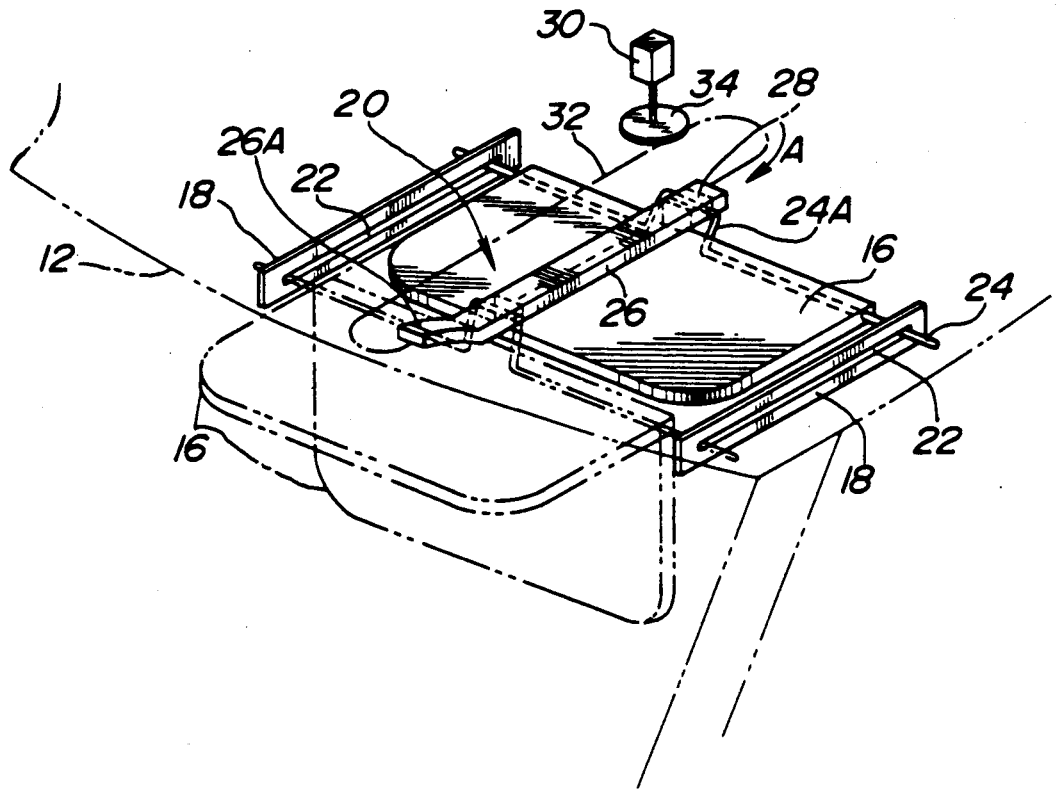
FIG. 1 is a perspective view showing a first embodiment of the present invention.

FIGS. 1 to 5 shows a first embodiment of the present invention. In this arrangement a frame 10 is secured to the forward lower surface of a vehicle roof structure 12. A headliner 14 which is secured to the inner surface of the roof panel and/or associated structure is moulded in a manner to define a concealed compartment 15 into which the sunvisor element or body 16 is receivable.

A pair of parallel guide rails 18 are arranged within the compartment and securely connected with the frame 10. A drive rail arrangement generally denoted by the numeral 20 is arranged at a level which is higher than that at which the guide rails 18 are arranged.

In the first embodiment, the guide rails 18 are formed with elongate slots 22 in which the axial ends of a shaped support shaft 24 on which the visor body 16 is fixedly supported, are respectively received in the slots 22 in the illustrated manner. It will be noted that in this case the ends of the slots 22 act as stopper members which limit the amount by which the support shaft 24 can be displaced in a direction parallel to the guide rails 18.

The drive rail arrangement 20 includes a guide rail 26 in which a slider element 28 is slidably received. The guide rail has an essentially C-shaped cross-section and in this case is provided with an arcuately curved section or portion 26A at the forward end (see FIGS. 3 to 5). This portion is designed to induce the slider 28 to follow an arcuate path which has a predetermined radius of curvature. The center of curvature lies on the axis about which the support shaft 24 is rotatable.

A reversible electric motor 30 is mounted on the frame via suitably brackets or the like (not shown in FIG. 1) and operatively connected with the slider via a cable 32 and drive pulley 34 arrangement. It should be noted that for the sake of clarity the disposition and arrangement of the drive rail arrangement has not be illustrated in FIG. 2.

The support shaft 24 is formed with a crank-like section 24A which is pivotally connected with the slider 28.

When the slider 28 is retracted to its rearmost position, the visor body is induced to assume the position illustrated in solid line. Viz., the crank portion 24A is induced to assume the position shown in FIG. 3 wherein it maintains the visor body 16 essentially parallel with the guide rails 18.

When the motor 30 is energized in a manner which moves the cable 32 in the direction indicated by arrow A in FIG. 1, the slider 28 is induced to slide toward the forward end of the drive rail 26 and thus moves the visor body 16 forward of the entrance of its concealed compartment 15.

The lengths of the slots 22 and the position of the arcuate portion 26A of the drive rail 26 are arranged so that, as the ends of the support shaft 24 encounter the foward ends of the slots 22 (which act as stoppers), the slider 28 reaches the arcuate portion 26A. As the support shaft 24 cannot be displaced any further in the foward direction, as the slider 28 is drawn up along the arcuate portion 26A of the rail, the visor body 16 is induced to pivot from the extended position shown in FIG. 4 to the shading position shown in FIG. 5.

By reversing the direction of the motor 30, it is possible to reverse the process and pivot the visor body 16 from the shading position to the projected one and thereafter withdraw the body 6 into the compartment 15 defined in the headliner 14.

Figure 6:
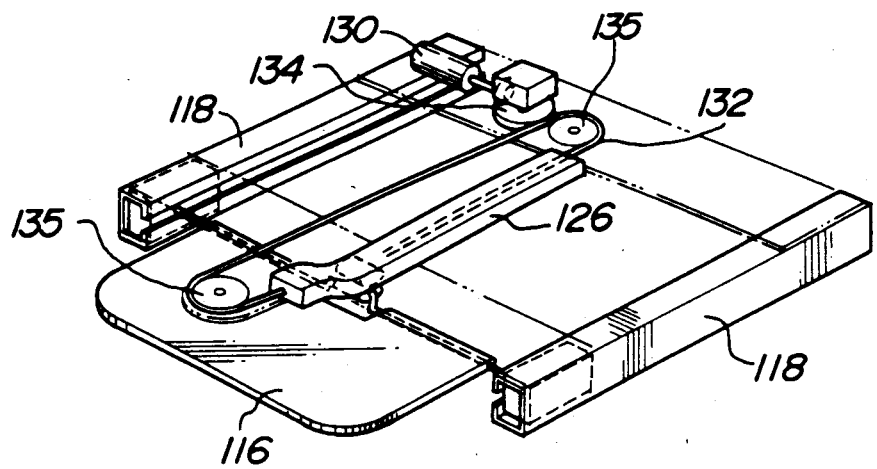
FIG. 6 is a perspective view of a second embodiment of the present invention showing the visor element being moved out of its storage position.
Figure 7:
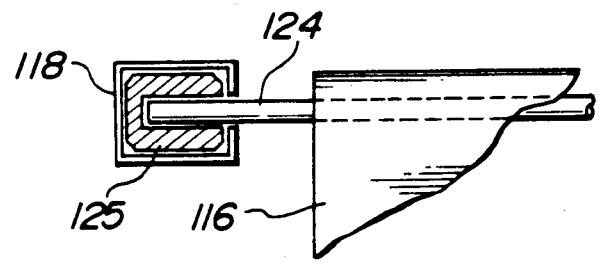
FIG. 7 is a sectional elevation of a guide rail construction utilized in the second embodiment.
Figure 8:
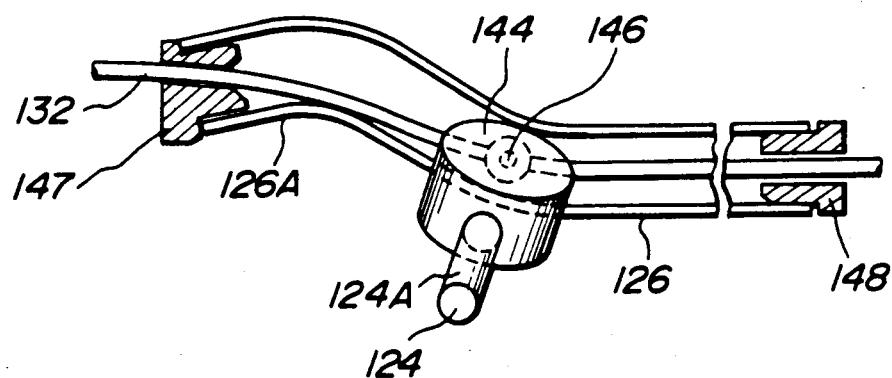
FIG. 8 is a side sectional elevation showing the construction of a drive rail arrangement which characterizes the second embodiment.
Figure 9:
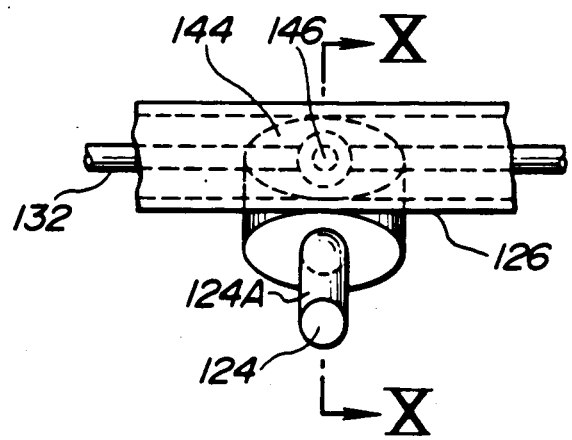
FIG. 9 is a side sectional elevation showing the orientation assumed by a slider element used in the second embodiment of the present invention when the visor is retracted into the storage compartment.
Figure 10:
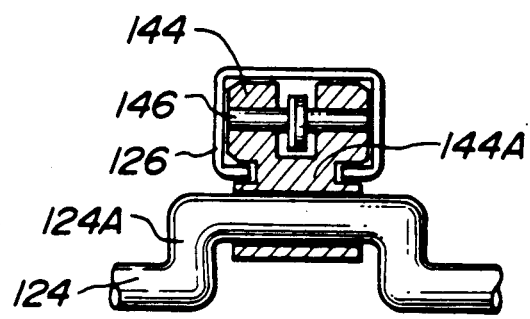
FIG. 10 is a front sectional elevation taken along section line X—X of FIG. 9.
Figure 11:
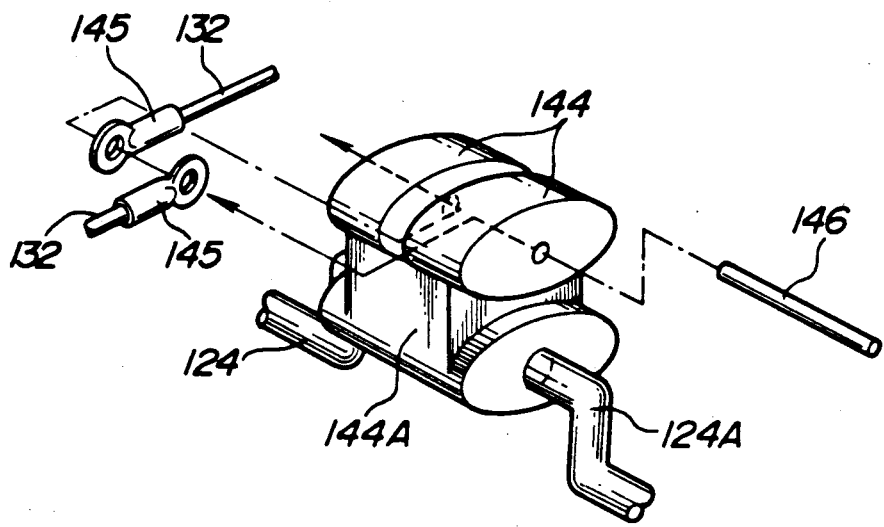
FIG. 11 is an exploded view showing the construction of the slider arrangement of the second embodiment.

FIG. 6 shows a second embodiment of the present invention. This arrangement is essentially similar to the first one and differs basically in the construction and arrangement of the guide rails. In this embodiment, channel cross-section guide rails 118 are used and the ends of the shaped support shaft 124 are pivotally mounted in slider members 125 (see FIG. 7). The forward ends of the guide rails 118 are provided with stoppers (not shown in this figure) which are arranged to abut the foward ends of the sliders 125 (followers) and thus limit the amount of forward travel of the visor body. Due to the channel configuration of the guide rails, the position of these stoppers can be selectively movable to facilitate adjustment of device.

Figure 12:
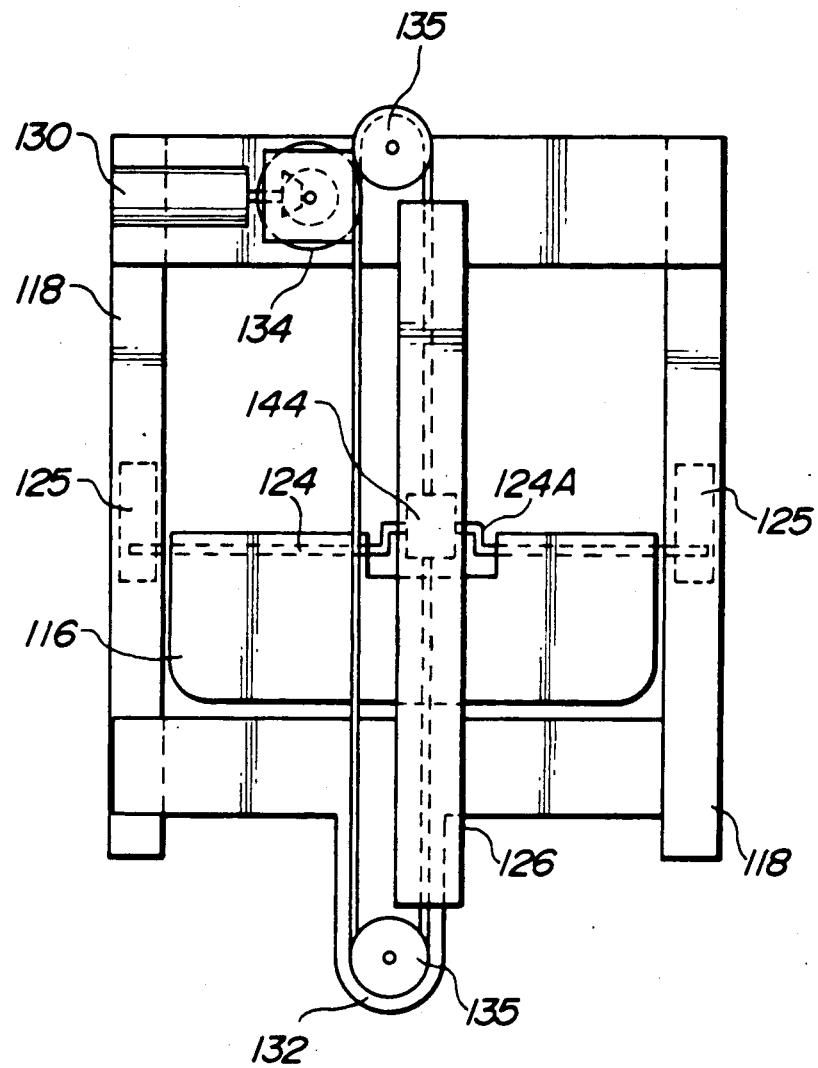
FIG. 12 is a plan view showing the second embodiment.

As best seen in FIG. 12, the motor 130, in this case, is arranged to be connected to the cable drive pulley 134 via a bevel gear (or the like) type of the step down gearing. Idler pulleys 135 are located at both ends of the drive rail 126, in the manner shown in FIG. 12, so as to appropriately deploy the cable 132 and promote smooth forward and rearward movement of the slider arrangement.

In order to ensure smooth ingress and regress of the slider into and out of the arcuate portion of the drive rail, the slider is constructed and arranged as shown in FIGS. 8 to 11. Viz., the members 144 which actually slide within the drive rail 126 are arranged to have essentially oval cross-sections, while the ends of the cable 132 are provided with connectors 145 which extend between the members 144 and are connected thereto via a pin 146. The pin is snugly received in coaxial bores formed in the slider members 144. A body portion 144A is formed integrally with the slider members 144. This body is formed with a bore through which a portion of the crank section 124A of the support shaft 124, is disposed.

The foward and rear ends of the drive rail 126 are provided with a grommet-like guide member 147, 148 through which the cable 132 is guidingly passed. The bore formed in the guide member 147 at the forward end of the rail is angled in a manner facilitate smooth uphill traction of the slider arrangement and jerk-free transition between the straight and arcuate sections of the drive rail.

The operation of this embodiment is essentially the same as the first one and as such a redundant description of the same is omitted.

FIG. 13 shows a third embodiment of the present invention. In this embodiment the arcuate portion of the drive rail is dispensed with, and a straight channel member 226 is used. The slider arrangement in this instance features a block-like member 244. This member 244 is provided with grooves on each side thereof and arranged so as to be slidingly supported on the inwardly extending flanges of the channel-section guide rail 216 in the manner illustrated in FIGS. 13 and 14. The block member 244 is further formed with an elongate slot 245 in which the crank portion 224A of the support shaft is slidably received. A spring 246 is arranged to bias the portion of the crank section 224A toward the bottom of the slot 245 in the manner indicated in FIG. 14.

In this embodiment the visor body 216 is provided with two guide pins or stopper members 248 which project from each side of the body at locations proximate the support shaft 224. These pins 248 are arranged to slided along the groove defined by the inwardly extending flanges of the guide rails 218 and to ensure that the visor body 216 assumes a suitable orientation when being retracted toward and moved out of its storage position.

Figure 16:
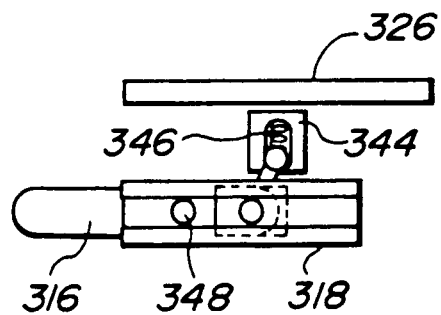
FIGS. 16 and 17 are side elevations depicting the operation which characterizes the third and fourth embodiments.
Figure 17:
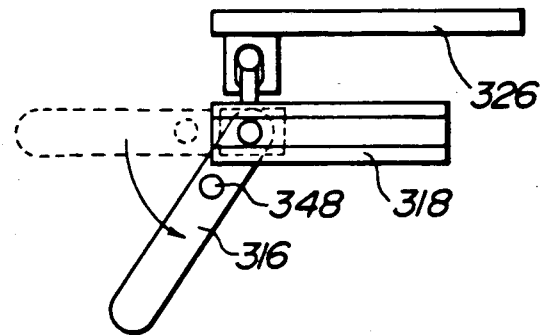

As will be understood, until the sliders 225 which support the ends of the support shaft 224 engage the upwardly extending flanges 250 which act as slider stoppers, the bias of the spring 246 cranks the support shaft 224 and the visor body 216 (which is fixedly mounted thereon), and maintains the visor body 216 essentially horizontal. However, upon the sliders 225 engaging the stoppers 250, as further forward displacement of the sliders is prevented, continued forward movement of the block 244 under the tractive influence of the cable 132, causes the support shaft 224 to be cranked against the bias of the spring 246 and to induce the pivoting of the visor body 216 downwardly toward its shadings or operative position. As will be noted from FIGS. 16 and 17, during the downward pivoting of the visor body 216, the portion of the support shaft 224 which is received in the elongate slot 245, is moved upwardly compressing the spring 246. This of course provides a bias which, when the slider arrangement is tracted toward the rear of the drive rail, causes the support shaft 224 to be cranked and swing the visor body 216 back up to the essentially horizontal position wherein it is aligned with the guide rail and can be tracted smoothly into the storage compartment.

Figure 15:
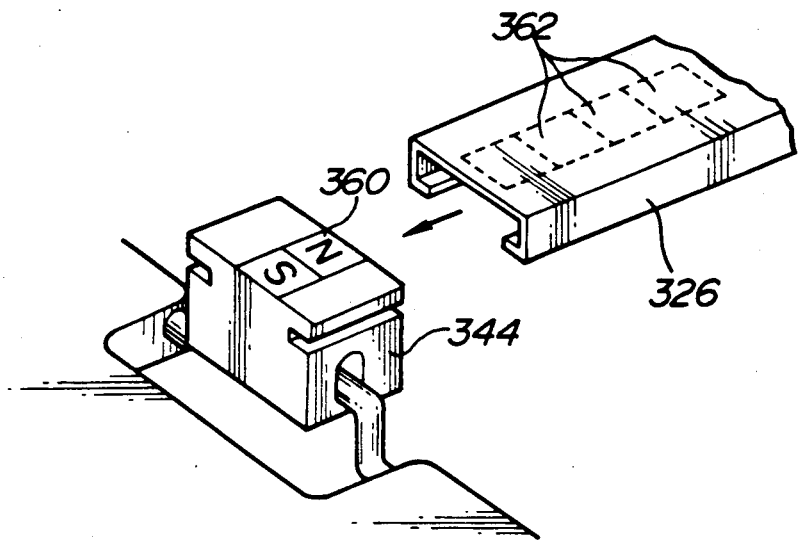
FIG. 15 is an exploded view of a fourth embodiment of the present invention which features the use of a linear motor in the drive rail.

FIG. 15 shows a fourth embodiment of the present invention. In this arrangement the motor and drive cable arrangement is replaced with a linear motor arrangement. As shown, the top of the block member (slider) 344 is provided with a permanent magnet 360 while the upper portion of the drive rail 326 is formed with a plurality of elements 362 which can be selectively magnetized. Depending on the sequence with which the selectively magnetizable elements 362 are energized and the polarities which are induced, the slide member can be induced to move forward and backward in a manner similar achieved with the motor and cable arrangement.

Figure 2:
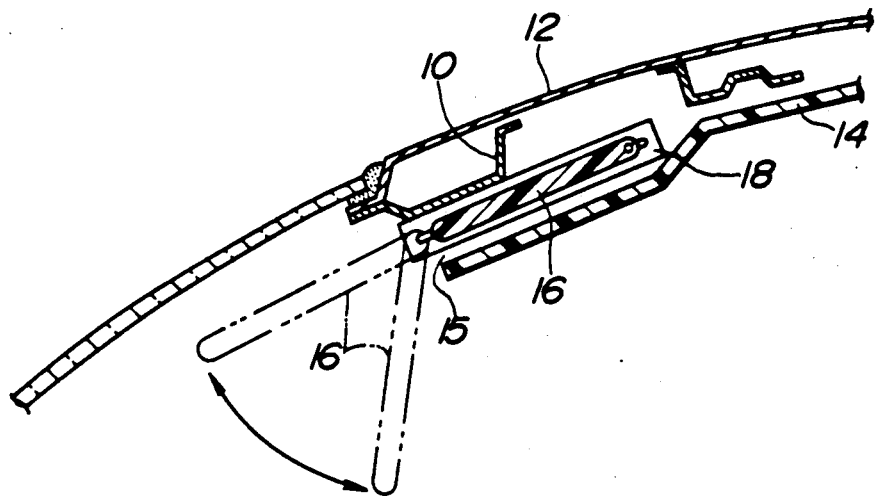
FIG. 2 is a sectional elevation taken along section line II—II of FIG. 1.
Figure 3:
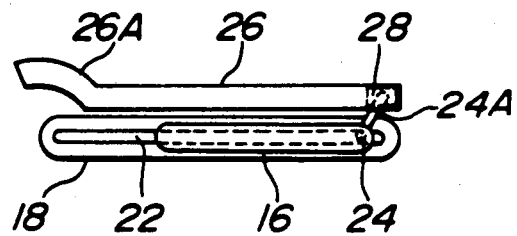
FIGS. 3 to 5 are schematic elevations showing the movement of the visor from a stored position to an operative position according to a first embodiment of the present invention.
Figure 4:
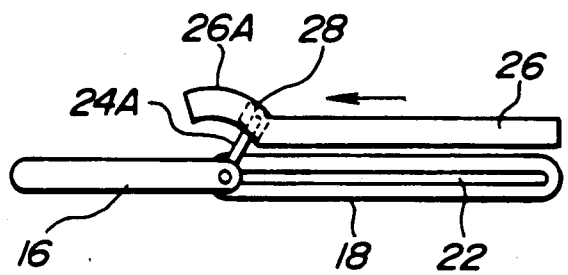
Figure 5:
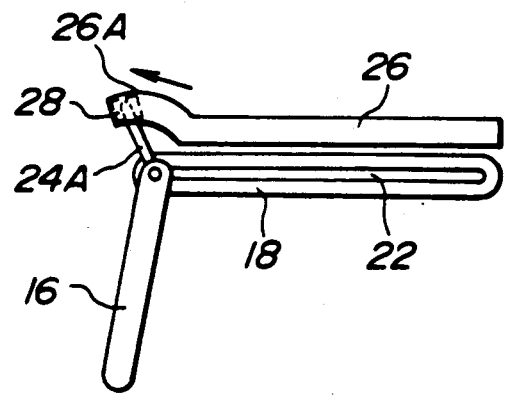
Figure 18:
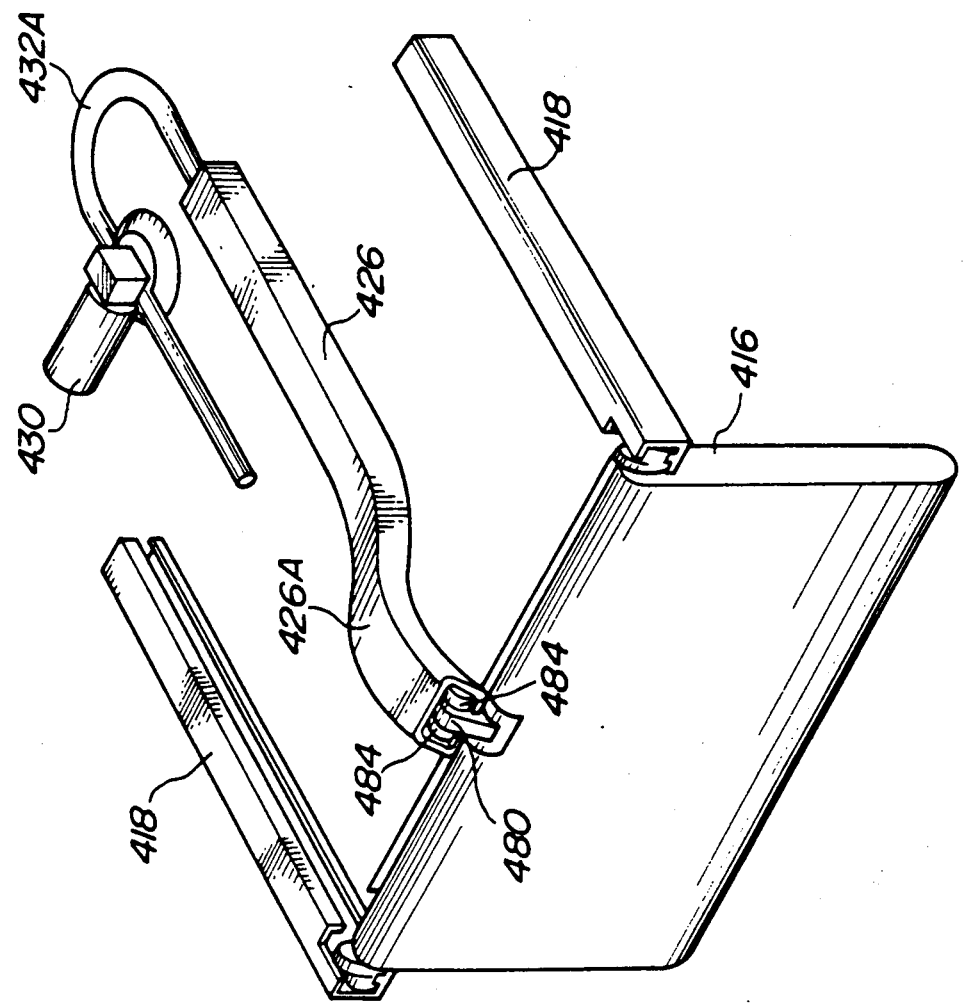
FIG. 18 is a perspective view showing a fifth embodiment of the present invention.
Figures 20, 21:
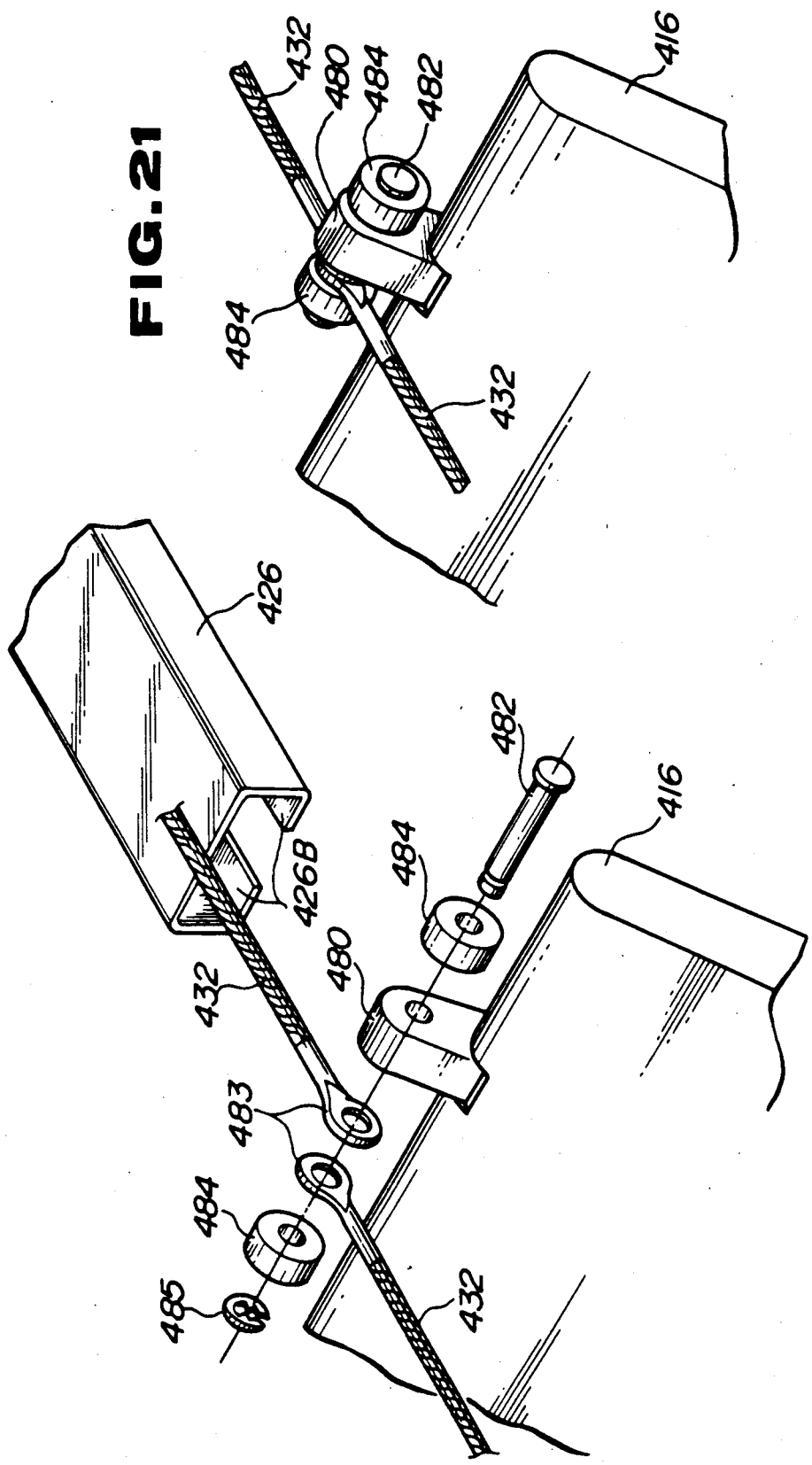
FIG. 20 is an exploded view of the fifth embodiment showing details of the connection arrangement between the drive cable and a boss which is fixedly connected to a shaft on which the visor body is pivotally supported.
FIG. 21 shows the arrangement shown in FIG. 22 in a fully assembled state.

FIGS. 18 to 26 show a fifth embodiment of the present invention. This embodiment is intended for mounting in an automobile roof, similarly to the positioning of the first embodiment as shown in FIGS. 1 and 2. Also, cable 432 can be formed as a continuous loop, similarly to cable 32 of FIG. 1. In this arrangement the support shaft 424 (see FIGS. 22, 23) is formed with a boss 480. As shown in FIG. 18, this boss 480 is arranged to extend through a carefully formed aperture in the visor body covering. The upper end of the boss 480 is connected to a cable 432 by way of a pin 482 which passes through a through hole formed in the boss, and eyelets 483 which are formed on each end of the cable. Rollers 484 are received on the pin 482 and located on either side of the boss 480. The pin 482 is retained in place by a snap ring 485 which is received in an annular groove formed proximate one end thereof.

The rollers 484 are received in the drive rail 426 which is formed with an arcuately curved portion 426A with a constant radius of curvature, in a manner similar to the first and second embodiments. The drive rail 426 has a channel-like cross-section. The rollers 480 are arranged to roll along the upper surfaces of inwardly extending flange portions 426B thereof while the boss 480 is arranged to pass through the slot defined therebetween.

Figure 19:
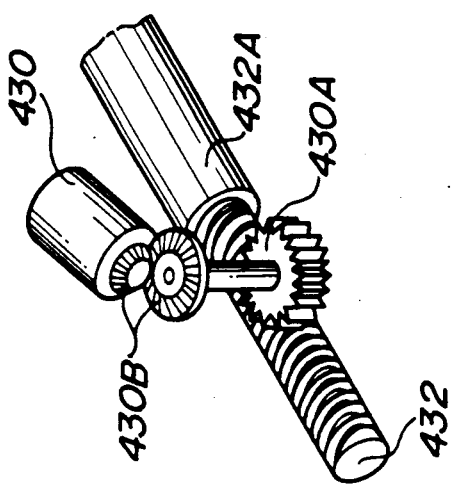
FIG. 19 is a perspective view showing details of the drive arrangement via which the visor is moved in and out of the storage compartment in accordance with the fifth embodiment.

In this embodiment the cable 432 is formed with helical ribbing which defines a rack, and is slidably received in an outer or sheath 432A. A reversible electric motor 430 is operatively connected with a pinion gear 430A through bevel gears 430B. The pinion gear 430A is, as shown in FIG. 19, arranged to mesh with the ribbing in the cable 432 (viz., the rack) in a manner which establishes a drive connection between the cable 432 and the motor 430.

The sliders 425 which are disposed on each end of the support shaft 424, each have a cylindrical shaft-like portion 425A and a cam-like lobe portion 425B, serving as a follower. The forward ends of the guide rails 418 are formed with upwardly turned flange members which act as stoppers 418A. The forward ends of the guide rails are also formed with cutouts 418B which permit the lobe portions 425B to pivot upwardly in the manner illustrated in FIGS. 24 to 26 upon the cylindrical portions 425A coming into engagement with the stoppers 418A.

With this embodiment, when the motor 430 is energized in a manner which draws the boss 480 toward the forward end of the drive rail 26, the visor body 416 is maintained essentially horizontal by the sliding of the lobe portions 425B within the channels formed in the guide rails 418. Viz., as shown in FIG. 24, the lobes 425B are dimensioned to slide horizontally within the guide rails 418 and thus prevent the rotation of the support shaft until such time as the sliders 425 reach the cut-out portions 418B.

When the sliders (followers) 425 reach the forward ends of the guide rails 418, the cylindrical portions 425R of the sliders engage the upwardly turned flanges which defines the stoppers 418A. At the same time the rollers 484 enter the arcuate portion 426A of the drive rail 426 and crank the support shaft 424 in a manner which rotates same and swings the visor body 416 downwardly toward an operative position. The cut-out portions 418B of the guide rails permit the sliders 425 to rotate along with the support shaft in the manner wherein the lobe portions are able to assume the upright positions shown in FIG. 25.

This pivoting action can continue until the sliders at least reach the position illustrated in FIG. 26. By controlling the operation of the motor 430, the point at which the pivoting stops and the angle at which the visor body 416 is set, can be selectively varied.

To return the visor 416 to a non-operative position wherein it is stored in its compartment, the motor 430 is energized in a manner to drive the cable 432 in a direction which pulls the boss 480 toward the rear end of the drive rail 426. As the rollers 484 roll along the arcuately curved portion of the dive rail 426A toward the straight portion thereof, the support shaft 424 is cranked in a direction which pivots the visor body 416 toward an essentially, horizontal position. The lobe portions 425B of the sliders pivot back to essentially horizontal positions wherein they can be tracted into the channel defined within the guide rails 425. Following this, as the boss 480 is drawn rearwardly by under the tractive influence of the cable 432, the sliders 425 slide back through the guide rails 418 maintaining the visor body 416 at an angle suitable for retraction into its storage compartment.

The various modifications and changes which can made without departing from the scope of the present invention will be apparent to those skilled in the art. For example, it is within the scope of the present invention to provide an auxiliary visor which is hingedly supported on the main visor and which can manually moved from a storage recess formed in the main visor swung to a position wherein it shades the side window.

Further, in place of the cable it is possible to form a rack along an edge of the drive rail and arranged for pinion gear, which is driven by an electric motor, to mesh therewith. In this arrangement the motor moves along the rack in a manner similar to a locomotive running along a railroad. The bracket on which the motor is supported can be directly connected with the visor and slidably supported on the drive rail via a suitable slider or roller arrangement.

What is claimed is:

1. An apparatus, comprising:
    an automotive body having a passenger compartment, the passenger compartment having a windshield, a roof and a headliner, a concealed space being defined between the roof and the headliner, the concealed space having an open front end directed generally parallel to the windshield;
    a visor;
    mounting means for slidably supporting said visor such that said visor is slidable from a concealed position in the concealed space to an exposed position adjacent the windshield end angularly movable in said exposed position through an arc having a first constant radius of curvature and extending from adjacent the windshield to a position angled inwardly of the passenger compartment; and
    a crank which is separate from said guide means and which operatively connects said visor with a selectively energizable drive means, said crank being movably mounted in drive rail, said crank having said crank having a portion which moves angularly upwardly through a second arc of constant radius of curvature when said visor moves angularly downward toward the position angled inwardly of said passenger compartment.

2. An apparatus comprising:
    an automotive body having a passenger compartment, the passenger compartment having a windshield, a roof and a headliner, a concealed space being defined between the roof and the headliner, said concealed space having an open front end directed generally parallel to the windshield;
    a visor;
    means for mounting said visor such that said visor is slidable from a concealed position in the concealed space to an exposed position adjacent the windshield and angularly movable in said exposed position through an arc having a constant radius of curvature and extending from adjacent the windshield to a position angled inwardly of the passenger compartment;
    said means for mounting comprising a first track having a linear guide and a first follower attached to a rear of said visor and positioned in the linear guide, the linear guide having a first end and a second end, the second end being positioned adjacent the open front of the concealed space, a second track having a guide with a linear guide portion and a curved guide portion and a second follower attached to said visor and positioned in the guide of the second track, the curved guide portion having a constant radius of curvature about the second end of said linear guide, the curved guide portion extending upwardly from the linear guide portion.

3. An apparatus as claimed in claim 2 wherein the curved guide portion extends beyond the second end of the linear guide.

4. An apparatus as claimed in claim 2 wherein the second track is positioned above said visor and the second follower extends up from the visor.

5. An apparatus as claimed in claim 4 wherein the second track is positioned centrally of said visor.

6. An apparatus as claimed in claim 2 including means attached to the second follower to cause powered movement of said visor out of and into the concealed space.

7. An apparatus as claimed in claim 2 including a third track having a linear guide and a third follower connected to said visor and received in the linear guide of the third track, the first and third tracks being positioned on opposite lateral sides of said visor.

8. An apparatus as claimed in claim 2 further comprising a stopper, said stopper being disposed at the second end of the linear guide of the first track, said stopper being arranged to engage the first follower and limit the movement thereof toward the open front of the concealed space.

9. An apparatus as claimed in claim 2 wherein the first track is a C-shaped channel.

10. An apparatus as claimed in claim 9 wherein the first follower has a low friction surface in contact with the C-shaped channel.

11. An apparatus as claimed in claim 9 wherein the first follower comprises a rod attached to said visor and a slider in the C-shaped channel, the follower being of a low friction material and having a hole for receiving the rod.

12. An apparatus as claimed in claim 2 further comprising a stopper, said stopper being disposed at the second end of the linear guide of the first track, said stopper being arranged to engage the first follower and limit the movement thereof toward the open front of the concealed space.

13. An apparatus comprising:

an automotive body having a passenger compartment, the passenger compartment having a windshield, a roof and a headliner, a concealed space being defined between the roof and the headliner, the concealed space having an open front end directed generally parallel to the windshield;

a visor;

means for mounting said visor such that said visor is slidable from a concealed position in the concealed space to an exposed position adjacent the windshield and angularly movable in the exposed position through an arc having a constant radius of curvature and extending from adjacent the windshield to a position angled inwardly of the passenger compartment said visor mounting means comprising:

a guide rail, said guide rail having an essentially C-shaped channel cross-section;

a slider, said slider being disposed in said guide rail and arranged to be slidable therein, said slider being connected to said visor;

a stopper, said stopper being disposed at one end of the guide rail and arranged to abut said slider to limit the movement thereof in a direction toward the open front of the concealed space;

a drive rail, said drive rail having an essentially C-shaped cross-section;

a projection extending from said visor;

a drive rail follower, said drive rail follower being received in said drive rail and operatively connected with said projection; and a motor, said motor being operatively connected with said drive rail follower and selectively operable to move said drive rail follower including means for causing said visor to undergo said angular movement.

14. An apparatus as claimed in claim 13 wherein the operative connection between said motor and said drive rail follower is established by a cable.

15. An apparatus as claimed in claim 14 wherein the cable has its ends connected to define a continuous loop, a portion of said loop extending through the drive rail.

16. An apparatus as claimed in claim 13 wherein said slider has an essentially cyindrical portion and a lobe shaped portion, the lobe shaped portion being arranged to slidingly engage wall portions of said guide rail in a manner which restrains the rotation of the cylindrical portion within said guide rail;

means defining an opening in said guide rail proximate said stopper, said opening being dimensioned so that when said guide rail follower engages said stopper, the restraint on the lobe portion of said slider is removed and said slider is rendered rotatable with respect to said guide rail.

17. An apparatus as claimed in claim 13 wherein said drive rail follower comprises a roller, the roller being arranged to roll along a surface of said drive rail.

18. An apparatus as claimed in claim 17 wherein said projection comprises a boss, the boss having a through hole in which a pin is disposed, the pin supporting said roller thereon.

19. An apparatus as claimed in claim 17 wherein said projection is fixedly connected to a shaft which extends across a top edge of said visor, one end of the shaft being fixedly connected to said slider.

20. An apparatus as claimed in claim 2 further comprising a motor, said motor being operatively connected with said visor mounting means.

21. An apparatus, comprising:

an automotive body having a passenger compartment, the passenger compartment having a windshield, a roof and headliner, a concealed space being defined between the roof and the headliner, the concealed space having an open front end directed generally parallel to the windshield;

a visor;

first guide means comprising first and second guide tracks positioned on opposite lateral sides of said visor and substantially concealed in the concealed space;

first and second followers attached to said lateral sides of said visor and received, respectively, in the first and second guide tracks;

second guide means for guiding said visor out of the concealed space and pivoting said visor about the first and second followers, said second guide means comprising a drive rail positioned above and in a lateral center of said visor and substantially concealed in the concealed space;

a drive rail follower extending from an upper surface of said visor into engagement with the drive rail; and means attached to said drive rail follower to produce powered movement of said drive rail follower;

said drive rail including a guide with a linear guide portion and a curved guide portion, the curved guide portion having a constant radius of curvature about one end of each of said first and second guide tracks.

22. An apparatus as claimed in claim 21 wherein the first and second guide tracks are C-shaped channels.

23. An apparatus as claimed in claim 22 wherein the first and second followers have low friction surfaces in contact, respectively, with the C-shaped channels.

24. An apparatus as claimed in claim 22 wherein the first and second followers comprise first and second rods attached to said visor and first and second sliders in the C-shaped channels, each the follower being formed of a low friction material and having a hole for receiving one of said rods.

25. An apparatus as claimed in claim 21 wherein the first and second followers are rigidly connected together.

* * * * *